(12) United States Patent
Viljoen (10) Patent No.: US 8,595,833 B2
(45) Date of Patent: *Nov. 26, 2013

(54) METHOD AND APPARATUS FOR DETERMINING SOFTWARE TRUSTWORTHINESS

(75) Inventor: Pieter Viljoen, Redondo Beach, CA (US)

(73) Assignee: Symantex Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/488,137

(22) Filed: Jun. 4, 2012

(65) Prior Publication Data

US 2012/0246721 A1    Sep. 27, 2012

Related U.S. Application Data

(63) Continuation of application No. 12/237,416, filed on Sep. 25, 2008, now Pat. No. 8,196,203.

(51) Int. Cl.
*H04L 29/06* (2006.01)

(52) U.S. Cl.
USPC .......................................................... 726/22

(58) Field of Classification Search
USPC .......................................................... 726/22
See application file for complete search history.

(56) References Cited

U.S. PATENT DOCUMENTS

| | | |
|---|---|---|
| 8,196,203 B2 | 6/2012 | Viljoen |
| 2002/0147659 A1* | 10/2002 | Hong et al. ..................... 705/26 |
| 2004/0153644 A1 | 8/2004 | McCorkendale et al. |
| 2005/0050115 A1 | 3/2005 | Kekre |
| 2005/0066015 A1* | 3/2005 | Dandekar et al. ............. 709/220 |
| 2005/0172284 A1* | 8/2005 | Dandekar et al. ............. 717/175 |
| 2005/0273856 A1 | 12/2005 | Huddleston |
| 2005/0278395 A1 | 12/2005 | Sandaire |
| 2006/0230452 A1 | 10/2006 | Field |
| 2007/0150948 A1* | 6/2007 | De Spiegeleer ................ 726/22 |
| 2007/0174915 A1 | 7/2007 | Gribble et al. |
| 2008/0168303 A1 | 7/2008 | Spear et al. |

* cited by examiner

*Primary Examiner* — Michael S McNally (74) *Attorney, Agent, or Firm* — Wilmer Cutler Pickering Hale and Dorr LLP (57) ABSTRACT

Aspects of the invention relate to a method, apparatus, and computer readable medium for determining software trustworthiness. In some examples, a software package identified as including at least one file of unknown trustworthiness is installed on a clean machine. A report package including a catalog of files that have been installed or modified on the clean machine by the software package is generated. Identification attributes for each of the files in the catalog is determined. Each of the files in the catalog is processed to assign a level of trustworthiness thereto. The report package is provided as output.

20 Claims, 5 Drawing Sheets

METHOD AND APPARATUS FOR DETERMINING SOFTWARE TRUSTWORTHINESS

CROSS-REFERENCE TO RELATED APPLICATIONS

This patent application is a continuation of U.S. patent application Ser. No. 12/237,416, filed Sep. 25, 2008, which is hereby incorporated by reference herein in its entirety.

BACKGROUND OF THE INVENTION

1. Field of the Invention

The present invention relates generally to computer systems. More particularly, the present invention relates to a method and apparatus for determining software trustworthiness.

2. Description of the Related Art

Consumers and businesses increasingly rely on computers to store sensitive data. Consequently, malicious programmers seem to continually increase their efforts to gain illegitimate control and access to others' computers and sensitive data. Such malicious programmers continue to create viruses, Trojan horses, worms, and like type programs meant to compromise computer systems and sensitive data belonging to others. These malicious programs are often generally referred to as "malware".

Security software companies are combating the growing tide of malware by developing various client security products, such as anti-virus, anti-spyware, or other types of anti-malware products. Some anti-malware products, however, impact client computer performance, as they are configured to monitor and analyze files and other sub-systems upon every access using various assessment rules. While some anti-malware products may cache results of the analysis for accessed files and sub-systems, such results are invalidated when assessment rules are changed. For example, in some anti-virus products, when the anti-virus signatures change, the previous assessment results are invalidated. This results in decreased client computer performance as each file/sub-system access is again analyzed. The problem is further compounded by the fact that anti-malware products look for known bad files on computers that typically do not have malware. Thus, anti-malware programs may decrease computer performance, while providing very little benefit for most computer systems and users.

Accordingly, there exists a need in the art for ascertaining the trustworthiness of software, while mitigating the performance impact on the client computer.

SUMMARY OF THE INVENTION

Aspects of the invention relate to a method, apparatus, and computer readable medium for determining software trustworthiness. In some embodiments, a software package identified as including at least one file of unknown trustworthiness is installed on a clean machine. A report package including a catalog of files that have been installed or modified on the clean machine by the software package is generated. Identification attributes for each of the files in the catalog is determined. Each of the files in the catalog is processed to assign a level of trustworthiness thereto. The report package is provided as output.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
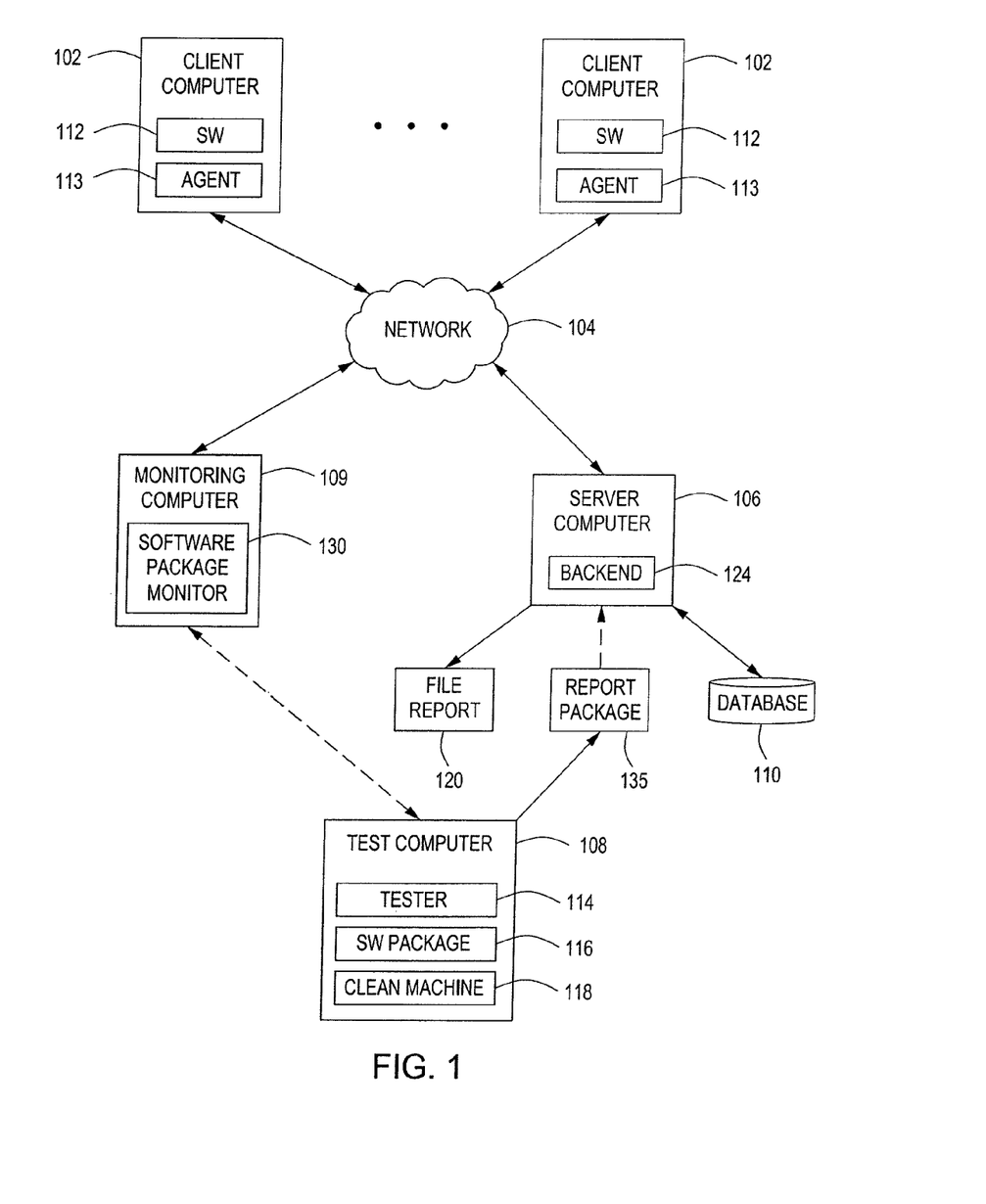
FIG. 1 is a block diagram depicting an exemplary embodiment of a computer system in accordance with one or more aspects of the invention.

FIG. 1 is a block diagram depicting an exemplary embodiment of a computer system 100 in accordance with one or more aspects of the invention. The system 100 includes client computers 102, a network 104, a server computer 106, a test computer 108, and a database 110. In some embodiments, the system 100 may also include a monitoring computer 109. The network 104 comprises a communication system that connects computer systems by wire, cable, fiber optic, and/or wireless links facilitated by various types of well-known network elements, such as hubs, switches, routers, and the like. In particular, the network 104 connects the client computers 102 and the server computer 106. The network 104 may employ various well-known protocols to communicate information. For example, the network 104 may employ internet protocol (IP), transmission control protocol (TCP), and the like for the transmission of packets. The network 104 may comprise part of a wide area network (WAN), such as the Internet, and/or all or part of a local area network (LAN).

Each of the client computers 102 includes software 112 and an agent 113. The computers 102 may comprise any type of computing devices capable of executing the software 112 and implementing the agent 113. The software 112 includes one or more operating systems, and may further include one or more application programs. The agent 113 may comprise software executable by the respective computer 102 to monitor the software 112 to detect malware. The agent 113 is configured to employ a "white list" to improve client computer performance. The agent 113 cooperates with a backend 124 implemented by the server computer 106 to determine whether files of interest in the software 112 are deemed trustworthy. The agent 113 includes files that can be trusted on the white list. Unless a given file on the white list is changed, the agent 113 does not monitor such file. Typically, a large number of files in the software 112 are legitimate and will be deemed trusted by the backend 124. Further, such files will not change often. As such, the number of files in the software 112 being monitored by the agent 113 is reduced, thereby improving client computer performance. Embodiments for determining software trustworthiness are described below.

Figure 2:
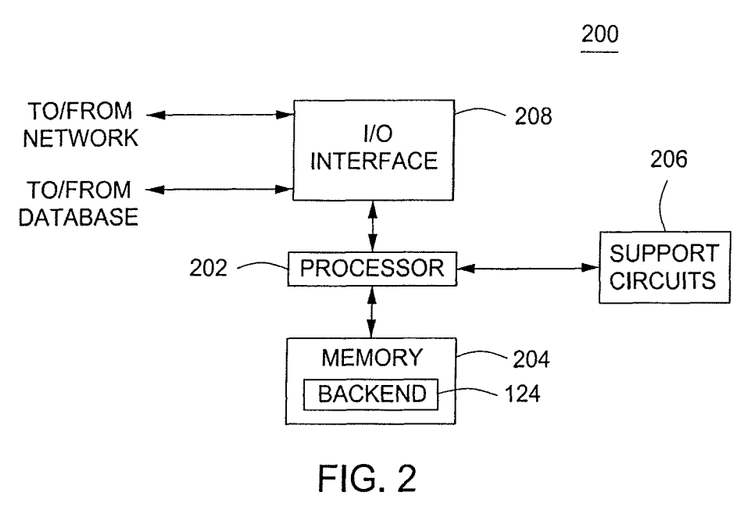
FIG. 2 is a block diagram depicting a server computer according to some embodiments of the invention.

The server computer 106 is configured to implement the backend 124. FIG. 2 is a block diagram depicting the server computer 106 according to some embodiments of the invention. The server computer 106 illustratively includes a processor 202, a memory 204, various support circuits 206, an I/O interface 208. The processor 202 may include one or more microprocessors known in the art. The support circuits 206 for the processor 202 include conventional cache, power supplies, clock circuits, data registers, I/O interfaces, and the like. The I/O interface 208 may be configured for communication with the network 104 and the database 110. The memory 204 may include one or more of the following random access memory, read only memory, magneto-resistive read/write memory, optical read/write memory, cache memory, magnetic read/write memory, and the like.

In some embodiments, the backend 124 may be implemented using software stored in the memory 204 and executed by the processor 202 to perform the functions described herein. It is to be understood, however, that the backend 124 may be implemented using specifically configured hardware, such as an application specific integrated circuit (ASIC) or the like. In other embodiments, the backend 124 may be implemented using a combination of specifically configured hardware and software.

Returning to FIG. 1, the backend 124 is configured to cooperate with the agent 113 in each of the client computers 102 to determine whether files of interest are trustworthy and thus may be white listed. In particular, the backend 124 is configured to service queries by the agents 113 for a trustworthiness level of particular files of interest. The queries may include identification information associated with the files of interest. In some embodiments, the identification information includes a digest for each file of interest. A digest may be a file identifier, such as a hash. A hash may be a value, code, sum, or other data calculated using a hash function (e.g., a function that takes an input of a data stream of any length and produces an output with a value of a certain fixed size). The hash function may be a cyclic redundancy check (CRC) hash function, a cryptographic hash function (e.g., a message digest algorithm 5 (MD5) hash function), a secure hash algorithm (SHA) hash function, or the like. Exemplary SHA hash functions include SHA-0, SHA-1, SHA-2, SHA-256, and SHA-512 has functions. It is to be understood that other public or proprietary hash algorithms may also be employed to determine a digest of a file. In some embodiments, the identification information may also include other file attributes, such as filename, a normalized file path, file size, and the like.

The database 110 is configured to store trustworthiness information for various files. The database 110 may comprise a relational database or the like that relates file identification information with a level of trustworthiness. For example, the database 110 may store relations between file digests and respective levels of trustworthiness. In some embodiments, each level of trustworthiness is selected from a plurality of levels. For example, files may be assigned a trustworthiness level selected from provider trusted, community trusted, not trusted, or unknown. "Provider trusted" indicates that the provider of the backend 124 trusts the file. "Community trusted" indicates that a community of users trusts the file. "Unknown" indicates that the file may or may not be trustworthy. "Not trusted" indicates that the file should not be trusted and may be malware. The backend 124 uses the received identification information for the files to query the database 110 and obtain respective trustworthiness levels for the files. The database 110 may be implemented using resources of the server computer 106 (e.g., the memory 204 in FIG. 2). Alternatively, the database 110 may be implemented using one or more separate storage devices and/or server computers.

Figure 3:
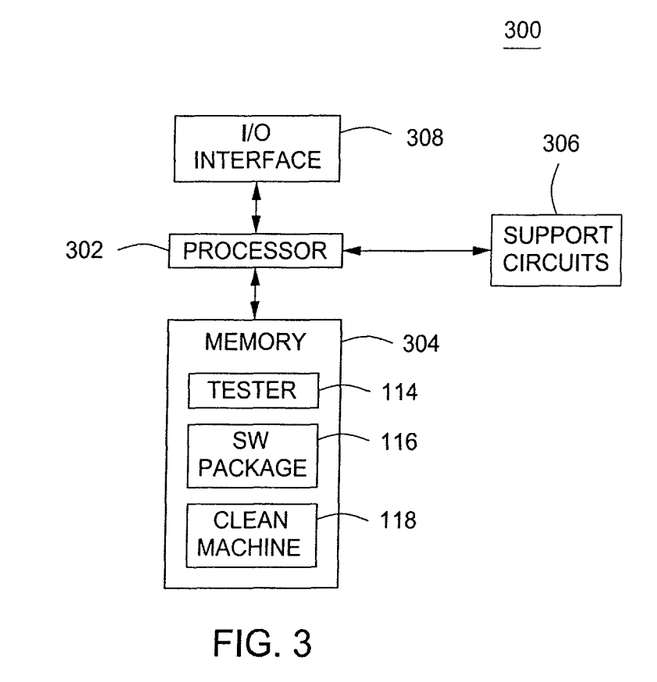
FIG. 3 is a block diagram depicting a test computer according to some embodiments of the invention.

The test computer 108 is used to test software packages and assign levels of trustworthiness to files. The test computer 108 is configured to implement a tester 114. FIG. 3 is a block diagram depicting the test computer 108 according to some embodiments of the invention. The test computer 108 illustratively includes a processor 302, a memory 304, various support circuits 306, an I/O interface 308. The processor 302 may include one or more microprocessors known in the art. The support circuits 306 for the processor 302 include conventional cache, power supplies, clock circuits, data registers, I/O interfaces, and the like. The memory 304 may include one or more of the following random access memory, read only memory, magneto-resistive read/write memory, optical read/write memory, cache memory, magnetic read/write memory, and the like.

In some embodiments, the tester 114 may be implemented using software stored in the memory 304 and executed by the processor 302 to perform the functions described herein. It is to be understood, however, that the tester 114 may be implemented using specifically configured hardware, such as an application specific integrated circuit (ASIC) or the like. In other embodiments, the tester 114 may be implemented using a combination of specifically configured hardware and software.

Figure 4:
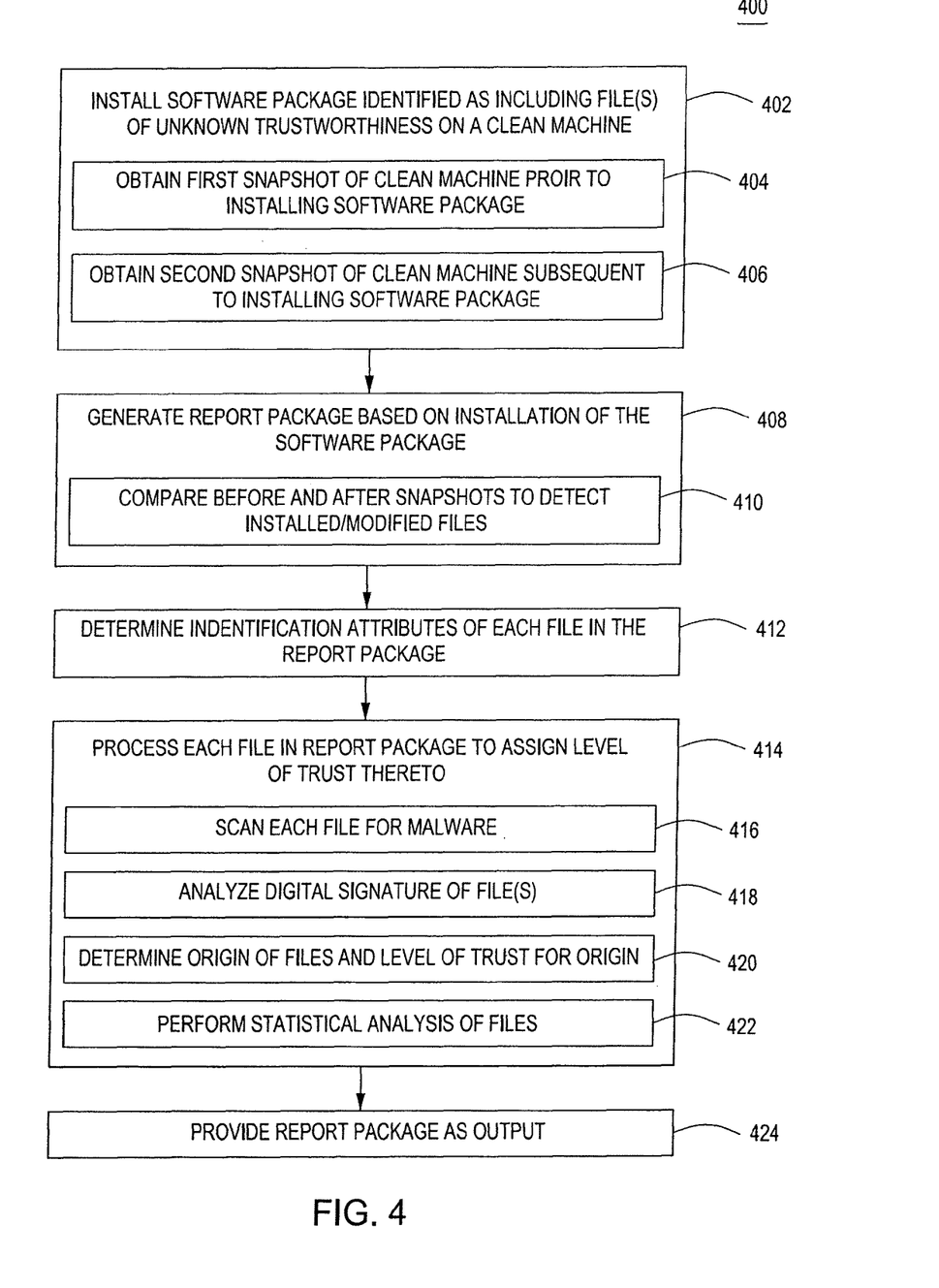
FIG. 4 is a flow diagram depicting a method for determining software trustworthiness in accordance with one or more aspects of the invention.

Returning to FIG. 1, the tester 114 is configured to determine levels of trustworthiness for files in software packages. FIG. 4 is a flow diagram depicting a method 400 for determining software trustworthiness in accordance with one or more aspects of the invention. Embodiments of the method 400 may be understood with reference to the computer system 100 shown in FIG. 1. The method 400 begins at step 402, where the tester 114 installs a software package 116 identified as including one or more files of unknown trustworthiness on a clean machine 118. In some embodiments, the clean machine 118 comprises a virtual machine executing on the test computer 108, such as a VMWARE virtual machine. The clean machine 118 is "clean" in that no other software packages other than an operating system are installed thereon. In cases where the software package 116 is an operating system, no software exists on the clean machine 118 (e.g., if the clean machine is a virtual machine in the test computer 108, a virtual machine image may be generated having the operating system being tested). It is to be understood that, rather than a virtual machine, the clean machine 118 may be implemented using hardware (e.g., hardware in the test computer 108 or another computer coupled to the test computer 108).

Figure 5:
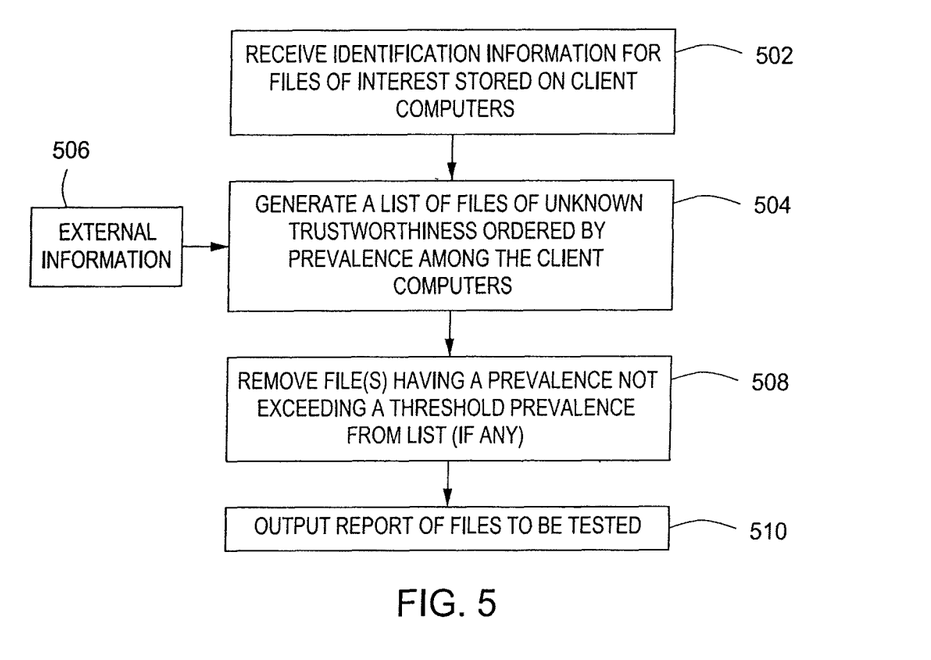
FIG. 5 is a flow diagram depicting a method for identifying a software package to be tested according to some embodiments of the invention.

In some embodiments, the software package 116 is identified using output from the server computer 106. FIG. 5 is a flow diagram depicting a method 500 for identifying a software package to be tested according to some embodiments of the invention. Embodiments of the method 500 may be understood with reference to FIG. 1. The method 500 begins at step 502, where the backend 124 receives identification information for files of interest stored on the client computers 102. Embodiments of the identification information are described above. At step 504, the backend 124 generates a list of files of unknown trustworthiness ordered by prevalence among the client computers 102. In some embodiments, the backend 124 determines the prevalence of the files using the identification information received at step 502. For example, the identification information indicates the number of the client computers 102 that have requested a trustworthiness level for a given file. Files for which a level of trustworthiness is requested by more client computers 102 are assigned a higher prevalence.

Files for which a level of trustworthiness is requested by less client computers 102 are assigned a lower prevalence. In some embodiments, the backend 124 may use other external information 506 instead of, or in combination with, the identification information from step 502 to determine prevalence. The external information 506 may include, for example, information from software publishers related to the prevalence of their software packages.

At step 508, the backend 124 removes from the list those files having a prevalence not exceeding a threshold prevalence (if any). For example, there may be a number of files for which a trust level has been requested by only a few client computers 102. The threshold prevalence may be set such that a particular number of client computer requests are required before testing of a file is triggered. At step 510, the backend 124 outputs a report 120 of files to be tested. The report 120 may be used by an administrator or user to identify one or more software packages that include the files to be tested. The administrator or user may obtain the software package(s) and store them or otherwise provide them to the test computer 108 (e.g., the software package 116).

Figure 6:
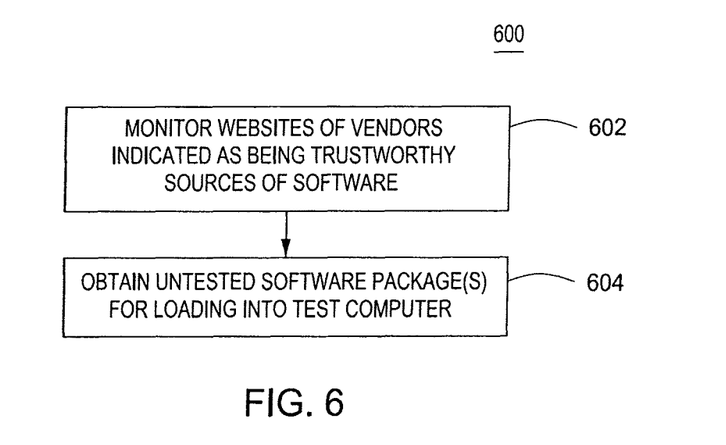
FIG. 6 is a flow diagram depicting a method of identifying a software package to be tested according to some embodiments of the invention.

Returning to step 402 of FIG. 4, in some embodiments, the software package 116 is identified automatically. FIG. 6 is a flow diagram depicting a method 600 of identifying a software package to be tested according to some embodiments of the invention. Embodiments of the method 600 may be understood with reference to FIG. 1. As shown in FIG. 1, the system 100 may include a monitoring computer 109 configured to a software package monitor 130. The software package monitor 130 may perform the method 600 to automatically identify software packages to be tested.

Figure 7:
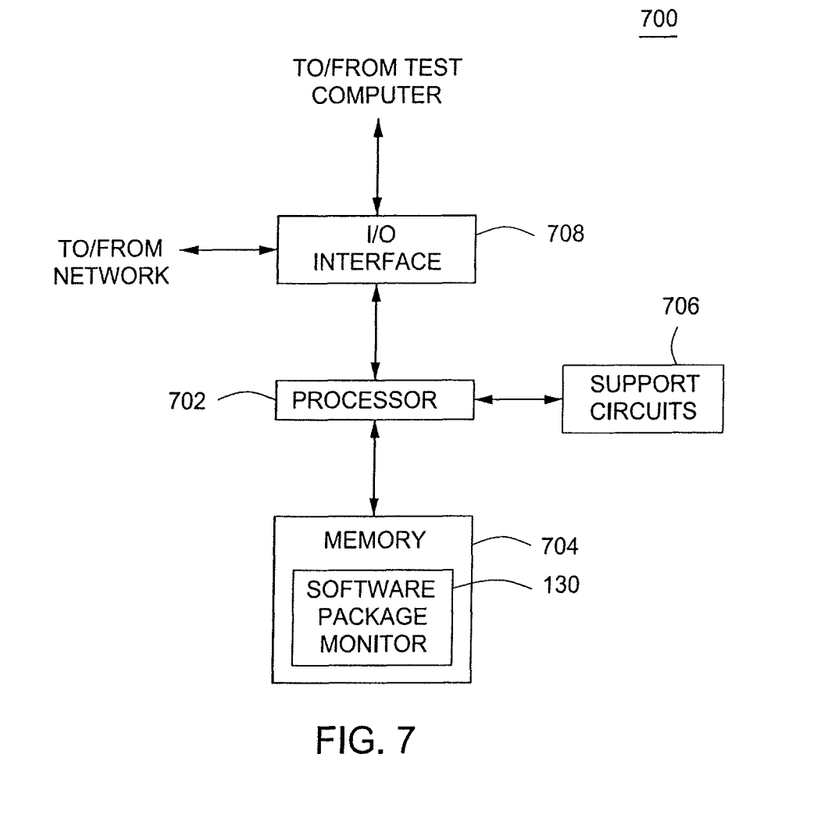
FIG. 7 is a block diagram depicting the monitoring computer according to some embodiments of the invention.

FIG. 7 is a block diagram depicting the monitoring computer 109 according to some embodiments of the invention. The monitoring computer 109 illustratively includes a processor 702, a memory 704, various support circuits 706, an I/O interface 708. The processor 702 may include one or more microprocessors known in the art. The support circuits 706 for the processor 702 include conventional cache, power supplies, clock circuits, data registers, I/O interfaces, and the like. The I/O interface 708 may be configured for communication with the network 104. The I/O interface 708 may also be configured for communication with the test computer 108. The memory 704 may include one or more of the following random access memory, read only memory, magneto-resistive read/write memory, optical read/write memory, cache memory, magnetic read/write memory, and the like.

In some embodiments, the software package monitor 130 may be implemented using software stored in the memory 704 and executed by the processor 702 to perform the functions described herein. It is to be understood, however, that the software package monitor 130 may be implemented using specifically configured hardware, such as an application specific integrated circuit (ASIC) or the like. In other embodiments, the software package monitor 130 may be implemented using a combination of specifically configured hardware and software.

Returning to FIGS. 1 and 6, the method 600 begins at step 602, where the software package monitor 130 monitors websites of vendors indicated as being trustworthy sources of software. For example, vendors of operating systems and other well known and popular software packages may be deemed as trustworthy sources of software. Such vendors may release new software packages and/or updates to current software packages at particular publishing points on the Internet (note that an update is considered to be a software packages for purposes of the present description). For example, a vendor of an operating system or other application may maintain a website that provides periodic updates for the operating system or application. The software package monitor 130 may be configured to monitor such websites to detect software packages that have not been tested. At step 604, the software package monitor 130 obtains the untested software package(s) for loading into the test computer 108. For example, the software package monitor 130 may download the untested software package(s) via the network 104. The software package monitor 130 may send the untested software package(s) directly to the test computer 109 (if the monitoring computer 109 is coupled to the test computer 108). Alternatively, an administrator or user may retrieve the downloaded software package(s) from the monitoring computer 109 and load them to the test computer 108.

Returning to step 402 of FIG. 4, in one embodiment, installation of the software package 116 proceeds as follows: At step 404, the tester 114 obtains a first snapshot of the software state of the clean machine 118 prior to installing the software package 116. For example, if the software package 116 is an application, then the software state in the first snapshot may be the state of the operating system prior to the application being installed. If the software package 116 is an operating system, then the software state may be empty (i.e., there is no software state). At step 406, the tester 114 obtains a second snapshot of the software state of the clean machine 118 subsequent to installing the software package 116. The second snapshot will differ from the first snapshot due to the files installed and/or modified by installation of the software package 116.

At step 408, the tester 114 generates a report package 135 based on installation the software package 116. The report package 135 includes a catalog of files that have been installed and/or modified on the clean machine 118 by the software package 116. In some embodiments, the tester 114 may generate the catalog of installed/modified files by comparing the first and second snapshots (e.g., before and after snapshots) generated in steps 404 and 406 (step 410). The report package 135 may include other information associated with the software package 116, such as version information, product vendor, and the like. The report package 135 may also include the binaries of the files installed/modified by the software package 116.

At step 412, the tester 114 determines identification attributes of each file in the catalog of the report package 135. The identification attributes may be the same or similar to the file identification data received from the client computers 102, namely, a digest (e.g., SHA-2 hash), filename, a normalized file path, file size, related software package, version information, digital signature, and the like.

At step 414, the tester 114 processes each of the files in the catalog of the report package 135 to assign a level of trustworthiness thereto. The trustworthiness level may be assigned to a given file using various methods and information. In some embodiments, the tester 114 scans each of the files in the catalog for malware (step 416). Techniques of scanning files for malware are known in the art. Files indicated as being malware are assigned a level of "not trusted". In some embodiments, the tester 114 analyzes a digital signature for one or more files in the catalog of the report package 135 (step 418). Some files installed by the software package 116 may be digitally signed by the vendor. In cases where the digital signature can be verified, the respective file can be assigned a level of "provider trusted" or "community trusted". In some embodiments, the tester 114 determines an origin of the files in the catalog and obtains a measure of trustworthiness of such origin (step 420). For example, the tester 114 may identify the vendor of the files and cross-reference the vendor against of list of known vendors and corresponding levels of trust. Vendors may be assigned different levels of trust, e.g., between "provider trusted", "community trusted", "not trusted", or "unknown". In some embodiments, the tester 114 may perform a statistical analysis of the files in the catalog (step 422). For example, the test computer 108 may be configured for communication with the database 110, which as described above may store identification files reported by the client computers 102. In some embodiments, the database 110 also maintains statistics for the client computers 102, including a "hygiene rating" or the like that indicates whether a particular client computer 102 is more or less likely to be affected by malware. The tester 114 may perform a statistical analysis of the files in the catalog with respect to existence of the files on the client computers 102 and hygiene ratings for the client computers 102. For example, if a file of unknown trustworthiness is known to be stored on client computers 102 with poor hygiene ratings (e.g., on average), the file may be deemed more likely to be malware and assigned a lower trust rating. Conversely, if a file of unknown trustworthiness is known to be stored on client computers 102 with good hygiene ratings (e.g., on average), the file may be deemed more likely to not be malware and assigned a higher trust rating. In some embodiments, the tester 114 performs a combination of steps 416 through 422 to determine an overall level of trustworthiness for each of the files in the catalog of the report package 135. In general, the level of trust determined in step 414 may be included as an attribute for each of the files in the catalog of the report package 135.

At step 424, the tester 114 provides the report package 135 as output. The report package 135 may then be used to update the database 110 vis-à-vis the files in the catalog and their respective levels of trustworthiness. In some embodiments, the report package 135 may be automatically provided to the server computer 106 and processed by the backend 124 to update the database 110. Alternatively, an administrator or other user can initiate an update of the database 110 based on the report package 135 (e.g., via cooperation with the server computer 106 or another computer).

In the embodiments of the invention described above, an exemplary structure of a server computer 106, a test computer 108, and a monitoring computer 109 is described. It is to be understood that other structures may be employed. In general, the functions of the backend 124, the tester 114, and the software package monitor 130 may be performed by one or more computers/servers. In some embodiments, the test computer 109 is isolated from the network 104 and/or other computers to obviate the possibility that the installation of the software package 116 will be corrupted by some external influence.

Aspects of the methods described above may be implemented as a program product for use with a computer system. Program(s) of the program product defines functions of embodiments and can be contained on a variety of computer readable media, which include, but are not limited to: (i) information permanently stored on non-writable storage media (e.g., read-only memory devices within a computer such as CD-ROM or DVD-ROM disks readable by a CD-ROM drive or a DVD drive); and (ii) alterable information stored on writable storage media (e.g., floppy disks within a diskette drive or hard-disk drive or read/writable CD or read/writable DVD). Such computer readable media, when carrying computer-readable instructions that direct functions of the invention, represent embodiments of the invention.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The invention claimed is:

1. A method of prioritizing software trustworthiness analysis, comprising:
receiving information associated with files of unknown trustworthiness stored on client computers;
determining, using at least one computer processor, prevalence of at least one file of the files stored on the client computers in response to the information;
removing from the information associated with files, information associated with at least one file in response to the prevalence thereof falling below a prevalence threshold; and
generating a list of files to be tested for trustworthiness based on the determined prevalence of the at least one file.

2. The method of claim 1, wherein the list of files to be tested is generated based on the determined prevalence of the at least one file exceeding the prevalence threshold.

3. The method of claim 1, wherein the list of files to be tested is generated based on a specified number of client computer requests for testing of the at least one file.

4. The method of claim 1, wherein the list of files to be tested is generated based on information from a software publisher related to the prevalence of a software package containing the at least one file.

5. The method of claim 1, wherein the list of files to be tested is used by a user to provide software to a test computer.

6. The method of claim 1, wherein software to be tested is provided by a software package monitor to a test computer.

7. The method of claim 6, wherein the test computer comprises a virtual machine.

8. The method of claim 1, wherein a software package containing the at least one file is listed in the generated list of files.

9. The method of claim 1, further comprising:
monitoring a website of a vendor indicated as being trustworthy sources of software; and
identifying a software package from the website for testing.

10. The method of claim 9, further comprising:
downloading the identified software package; and
providing the identified software package to a test computer.

11. A non-transitory computer readable storage medium having stored thereon instructions that when executed by a processor cause the processor to perform a method of prioritizing software trustworthiness analysis, comprising:
receiving information associated with files of unknown trustworthiness stored on client computers;
determining, using at least one computer processor, prevalence of at least one file of the files stored on the client computers in response to the information;
removing from the information associated with files, information associated with at least one file in response to the prevalence thereof falling below a prevalence threshold; and
generating a list of files to be tested for trustworthiness based on the determined prevalence of the at least one file.

12. An apparatus for prioritizing software trustworthiness analysis, comprising:
at least one computer processor configured to:
receive information associated with files of unknown trustworthiness stored on client computers;
determine, using at least one computer processor, prevalence of at least one file of the files stored on the client computers in response to the information;

remove from the information associated with files, information associated with at least one file in response to the prevalence thereof falling below a prevalence threshold; and generate a list of files to be tested for trustworthiness based on the determined prevalence of the at least one file.

13. The apparatus of claim 12, wherein the list of files to be tested is generated based on the determined prevalence of the at least one file exceeding the prevalence threshold.

14. The apparatus of claim 12, wherein the list of files to be tested is generated based on a specified number of client computer requests for testing of the at least one file.

15. The apparatus of claim 12, wherein the list of files to be tested is generated based on information from a software publisher related to the prevalence of a software package containing the at least one file.

16. The apparatus of claim 12, wherein software to be tested is provided by a software package monitor to a test computer.

17. The apparatus of claim 16, wherein the test computer comprises a virtual machine.

18. The apparatus of claim 12, wherein a software package containing the at least one file is listed in the generated list of files.

19. The apparatus of claim 12, wherein the computer processor is further configured to:

monitor a website of a vendor indicated as being trustworthy sources of software; and identify a software package from the website for testing.

20. The apparatus of claim 19, wherein the computer processor is further configured to:

download the identified software package; and provide the identified software package to a test computer.

\* \* \* \* \*

UNITED STATES PATENT AND TRADEMARK OFFICE
CERTIFICATE OF CORRECTION

PATENT NO. : 8,595,833 B2
APPLICATION NO. : 13/488137
DATED : November 26, 2013
INVENTOR(S) : Pieter Viljoen It is certified that error appears in the above-identified patent and that said Letters Patent is hereby corrected as shown below:

Title Page: Item (73) should read:

(73) Assignee: ~~Symantex~~ Symantec Corporation, Mountain View, CA (US)

Signed and Sealed this
Eighteenth Day of February, 2014

Michelle K. Lee
*Deputy Director of the United States Patent and Trademark Office*